United States Patent
Jagmag et al.

(10) Patent No.: US 9,563,226 B2
(45) Date of Patent: Feb. 7, 2017

(54) DYNAMIC CLOCK REGULATION BASED ON DUTY CYCLE THRESHOLDS

(71) Applicant: Marvell World Trade Ltd., St. Michael (BB)

(72) Inventors: Adil Jagmag, Hollis, NH (US); Zhiming Xu, Shanghai (CN); Jisheng Zhang, Shanghai (CN); Haihua Jin, Shanghai (CN); Yiran Liao, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 145 days.

(21) Appl. No.: 14/480,489

(22) Filed: Sep. 8, 2014

(65) Prior Publication Data

US 2015/0082076 A1 Mar. 19, 2015

Related U.S. Application Data

(60) Provisional application No. 61/877,710, filed on Sep. 13, 2013.

(51) Int. Cl.
*G06F 1/32* (2006.01)
*G06F 1/04* (2006.01)
*G06F 1/20* (2006.01)

(52) U.S. Cl.
CPC .............. *G06F 1/04* (2013.01); *G06F 1/3203* (2013.01); *G06F 1/324* (2013.01); *G06F 1/206* (2013.01); *G06F 1/3296* (2013.01); *Y02B 60/1217* (2013.01)

(58) Field of Classification Search
CPC ................................. G06F 1/206; G06F 1/324
See application file for complete search history.

(56) References Cited

U.S. PATENT DOCUMENTS

| | | | |
|---|---|---|---|
| 6,510,400 B1 | 1/2003 | Moriyama | |
| 8,924,752 B1 * | 12/2014 | Law ....................... | G06F 1/206 713/322 |
| 2012/0166861 A1 | 6/2012 | Lu | |
| 2013/0061069 A1 | 3/2013 | Thomson et al. | |
| 2013/0111241 A1 * | 5/2013 | Ha ....................... | H04W 52/029 713/322 |
| 2013/0127550 A1 | 5/2013 | Sutardja et al. | |
| 2014/0189398 A1 * | 7/2014 | Gorbatov ................ | G06F 1/206 713/323 |

OTHER PUBLICATIONS

International Search Report and Written Opinion for PCT/US2014/054604, filed on Sep. 8, 2014.

* cited by examiner

*Primary Examiner* — Albert Wang (57) ABSTRACT

A clock frequency is controlled by determining a cumulative duty cycle according to a ratio of a cumulative time, during an interval, that the clock frequency has a frequency greater than or equal to a design frequency threshold value to a duration of the interval. A frequency of the clock frequency is controlled to be a first frequency value when the cumulative duty cycle is less than a first duty cycle threshold; and controlled to be a second frequency value substantially less than the first frequency value when the cumulative duty cycle is greater than a second duty cycle threshold. The second duty cycle threshold is greater than or equal to the first duty cycle threshold.

19 Claims, 5 Drawing Sheets

DYNAMIC CLOCK REGULATION BASED ON DUTY CYCLE THRESHOLDS

CROSS REFERENCE TO RELATED APPLICATIONS

This present disclosure claims the benefit of U.S. Provisional Application No. 61/877,710, filed on Sep. 13, 2013, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Integrated circuits (chips), including Systems-On-a-Chip (SoCs), are operated at high clock speeds to provide increased performance. In an application, a chip may not be controlled to provide maximum performance at all times, and therefore may not operate at the highest achievable clock speed at all times.

Operating at higher clock speeds can have substantial drawbacks. A chip's power consumption when operating at higher frequencies may be higher than when operating at lower frequencies even when the operating voltage is the same. Furthermore, operating at the higher frequency may require operating the chip at a higher operating voltage, which may further increase the chip's power consumption.

Higher power consumption produces higher temperatures on the chip. To prevent the chip temperatures from exceeding a design maximum, better packages and/or better heat sinks may be required, which increases the costs for a device including the chip.

Because of the increased power consumption and heat generated by operating at higher speeds, chips designed to operate at a high design frequency may not continue to operate reliably when the chips is continuously operated at the design frequency for an extended period of time.

SUMMARY

In an embodiment, a computer-implemented method for controlling a clock frequency comprises determining a cumulative duty cycle (DC) according to a ratio of a cumulative time, during an interval, that the clock frequency has a frequency greater than or equal to a design frequency threshold value to a duration of the interval; controlling a frequency of the clock frequency to be a first frequency value when the cumulative DC is less than a first duty cycle threshold (DCT); and controlling the frequency of the clock frequency to be a second frequency value substantially less than the first frequency value when the cumulative DC is greater than a second DCT. The second DCT is greater than or equal to the first DCT.

In an embodiment, the method includes configuring a frequency control subsystem to control the clock frequency according to a current utilization of a circuit using the clock frequency when the cumulative DC is less than the first DCT. The frequency of the clock frequency is a maximum frequency of the clock frequency, and the first and second frequency values are first and second maximum frequency values, respectively.

In an embodiment, the method includes controlling a load threshold of the frequency control subsystem to have a first load threshold value when the cumulative DC is less than the first DCT. The frequency control subsystem is configured to increase the clock frequency when the current utilization of the circuit is greater than the load threshold and the clock frequency is less than the first maximum frequency value.

In an embodiment, the method includes controlling the load threshold of the frequency control subsystem to have a second load threshold value when the cumulative DC is greater than a third DCT and less than the second DCT, wherein the third DCT is less than the second DCT.

In an embodiment, the method includes when a system including the clock circuit has a mode equal to a predetermined mode value, controlling the frequency of the clock frequency to be a third frequency value and controlling the load threshold of the frequency control subsystem to have a second load threshold value.

In an embodiment, the method includes controlling the clock frequency to be a third frequency value in response to receiving a command to boot a system or to launch an application, regardless of the value of the cumulative DC.

In an embodiment, the interval includes a total operating time of the clock circuit or a total time between a time the clock circuit is first turned on and a present time.

In an embodiment, the design frequency threshold value is a maximum design frequency of a circuit operated using a signal having the clock frequency or a predetermined fraction of the maximum design frequency.

In an embodiment, the clock circuit provides a signal at the clock frequency to a Central Processing Unit (CPU).

In an embodiment, determining the cumulative DC includes estimating the ratio according to a use case.

In an embodiment, a system for controlling a clock frequency of a clock circuit comprises a hardware platform including a processor, a clock circuit having a clock frequency, and a power management subsystem (PM). The PM is configured to determine a cumulative duty cycle (DC) according to a ratio of a cumulative time, during an interval, that the clock frequency has a frequency greater than a design frequency threshold value during an interval to a duration of the interval, control a frequency of the clock frequency to be a first frequency value when the cumulative DC is less than a first duty cycle threshold (DCT), and control the frequency of the clock frequency to be a second frequency value substantially less than the first frequency value when the cumulative DC is greater than a second DCT. The second DCT is greater than or equal to the first DCT.

In an embodiment, the system includes a frequency control subsystem. The frequency control subsystem is configured to control the clock frequency according to a current utilization of a hardware subsystem being operated using the clock frequency when the cumulative DC is less than the first DCT. The frequency is a maximum frequency of the clock frequency, and the first and second frequency values are first and second maximum frequency values, respectively.

In an embodiment, the PM is configured to control a load threshold of the frequency control subsystem to have a first load threshold value when the cumulative DC is less than the first DCT, and the frequency control subsystem is configured to increase the clock frequency when the current utilization of the hardware subsystem is greater than the load threshold and the clock frequency is less than the first frequency value.

In an embodiment, the PM is configured to control the load threshold of the frequency control subsystem to have a second load threshold value when the cumulative DC is greater than a third DCT and less than the second DCT. The third DCT is less than the second DCT.

In an embodiment, the PM is configured to control the frequency of the clock frequency to be a third frequency value and control the load threshold of the frequency control subsystem to have a second load threshold value when a system including the clock circuit has a mode equal to a predetermined mode value.

In an embodiment, the PM is configured to control the clock frequency to be a third frequency value in response to the system receiving a command to boot a system or to launch an application, regardless of the value of the cumulative DC.

In an embodiment, the interval includes a total operating time of the clock circuit or a total time between a time the clock circuit is first turned on and a present time.

In an embodiment, determining the cumulative DC includes estimating the ratio according to a use case.

Another embodiment includes a non-transitory computer-readable medium encoded with computer-executable instructions for controlling a clock frequency, which, when executed, perform a method comprising: determining a cumulative duty cycle (DC) according to a ratio of a cumulative time the clock frequency has a frequency greater than a design frequency threshold value during an interval by a duration of the interval; controlling a frequency of the clock frequency to be a first frequency value when the cumulative DC is less than a first duty cycle threshold (DCT); and controlling the frequency of the clock frequency to be a second frequency value substantially less than the first frequency value when the cumulative DC is greater than a second DCT. The second DCT is greater than or equal to the first DCT.

In an embodiment, controlling the frequency of the clock frequency to be the first frequency value includes configuring a frequency control subsystem to control the clock frequency according to a current utilization of a circuit using the clock frequency. The frequency is a maximum frequency of the clock frequency, and the first and second frequency values are first and second maximum frequency values, respectively.

In an embodiment, controlling a frequency of the clock frequency to be the first frequency value includes controlling a load threshold of the frequency control subsystem to have a first load threshold value. The frequency control subsystem is configured to increase the clock frequency when the current utilization of the circuit is greater than the load threshold and the clock frequency is less than the first maximum frequency value.

DETAILED DESCRIPTION

Figure 1:
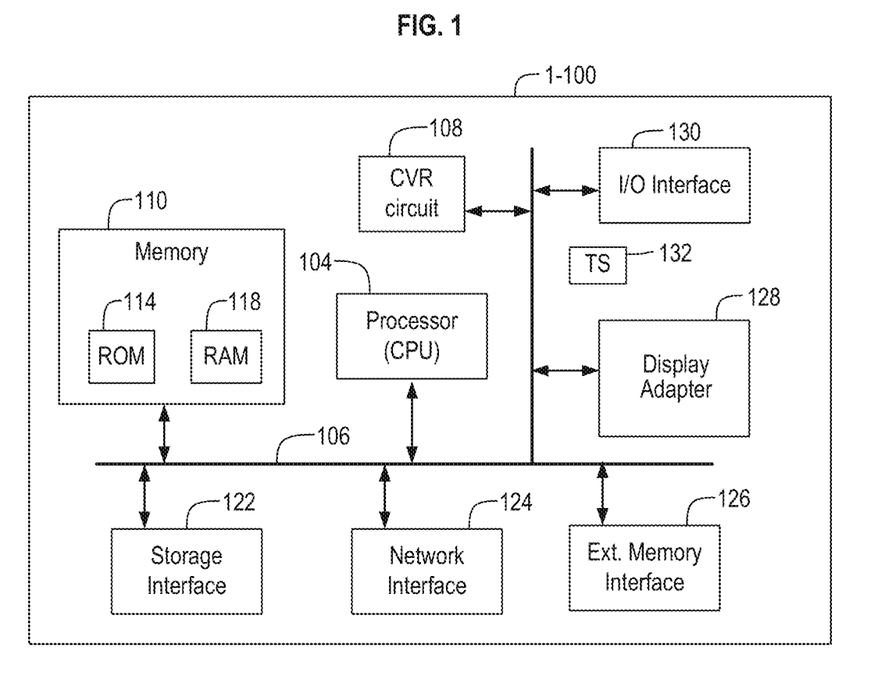
FIG. 1 is a block diagram of a System-On-a-Chip (SoC) including an embodiment of the disclosure.

FIG. 1 illustrates System-on-a-Chip (SoC) 1-100 according to an embodiment of the present disclosure. The SoC 1-100 includes a processor or Central Processing Unit (CPU) 104, a bus 106, a Clock and Voltage Regulation (CVR) circuit 108, a memory 110, and a plurality of peripheral circuits. The plurality of peripheral circuits include a storage interface 122, a network interface 124, an external memory interface 126, a display adapter 128, and an Input/Output (I/O) interface 130. The SoC 1-100 also includes a temperature sensor circuit TS 132 configured to sense one or more temperatures within the SoC 1-100. In an embodiment, the TS 132 monitors a temperature of the CPU 104.

Although CPU 104 is described in this embodiment as being a processor, embodiments are not limited thereto. In an embodiment, CPU 104 may be a programmable Graphics Processing Unit or other type of semiconductor circuit that executes processing instructions stored in the memory 110, fetched from an external memory device connected to the external memory interface 126, or fetched from an external storage device connected to the storage interface 122.

The memory 110 may include various forms of volatile or non-volatile storage media. For example, the memory 110 may include a ROM 114 and a RAM 118. The external memory interface 126 may include one or more of a single data rate (SDR) Synchronous Dynamic Random Access Memory (SDRAM) controller, a double data rate (DDR) SDRAM controller, a Flash memory controller, and the like. The storage interface 122 may include one or more of a flash memory card interface, a Serial ATA (SATA) interface, and the like. The memory 1-100, devices attached to the external memory interface 126, and devices attached to the storage interface 122 may each include non-transitory computer-readable media.

The network interface 124 may include one or more of an Inter-Integrated Circuit (I2C) bus interface, a Low Pin Count (LPC) bus interface, an Ethernet interface, and the like.

The display adapter 128 may include one or more of a Video Graphics Array (VGA) interface, a High Definition Multimedia Interface (HDMI™), Flat Panel Display Link (FPD-Link), and the like. The display adapter 128 may also include accelerator circuits for use in the creation of display data and the processing of multimedia data such as audio, video, and images.

The I/O interface 130 may include one or more of an analog to digital converter (ADCs), a digital to analog converter (DACs), a Universal Asynchronous Receiver Transmitter (UART), touch screen interface, digital input, digital output, and the like. An ADC of the I/O interface 130 may be connected to the TS 132 and may produce a digital signal according to a temperature of the SoC 1-100. An input of the I/O interface 130 may be connected to a power switch of a device that includes the SoC 1-100.

The CVR circuit 108 controls a CPU clock signal supplied to the CPU 104, including controlling a frequency of the CPU clock signal. The CVR circuit 108 may also control peripheral clocks supplied to one or more of the plurality of peripheral circuits. In an embodiment, the CVR circuit 108 also controls a supply voltage to the CPU 104 and/or respective supply voltages to one or more of the plurality of peripheral circuits.

In an embodiment, the SoC 1-100 is configured to govern a cumulative duty cycle of one or more subsystems of the SoC 1-100 over an interval, such as by governing a fraction of time in the interval that a subsystem of the SoC 1-100 spends operating at or above a predetermined frequency or operating at or above a predetermined load level. Although embodiments are described herein in terms of governing a cumulative duty cycle of a CPU, embodiments are not limited thereto, and the SoC 1-100 may be configured to govern respective cumulative duty cycles of one or more of a CPU, a graphics processor, a video decoder, a signal processor, and the like.

In an embodiment, the SoC 1-100 is configured to govern the cumulative duty cycle of a subsystem of the SoC 1-100 by a processor executing computer programming instructions stored on non-transitory computer-readable media. In an embodiment, the SoC 1-100 is configured to govern the cumulative duty cycle of a subsystem of the SoC 1-100 by using electronic circuits, such as by using a state machine and associated volatile and non-volatile memories or registers in the CVR circuit 108.

Figure 2:
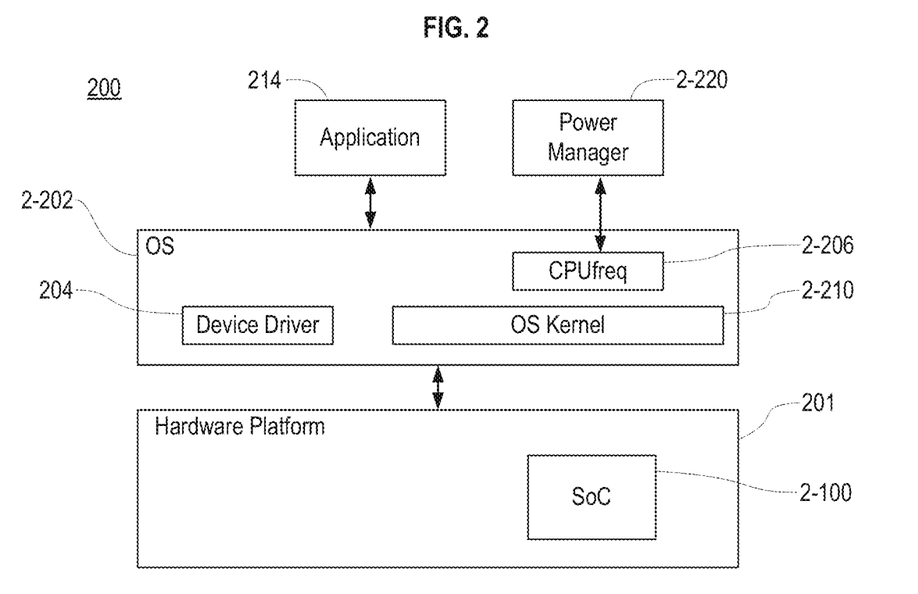
FIG. 2 is a block diagram of a system according to an embodiment.

FIG. 2 is a diagram of a system 200. The system 200 may be included in a mobile phone, a tablet, a laptop computer, a desktop computer, a server computer, a computer peripheral device, a smart appliance, a set top box, networking equipment, automotive electronics, avionics, medical devices, or other electronic devices. In an embodiment, the system 200 is included in an electronic device having a requirement for a long service life.

The system 200 includes a hardware platform 201 that includes a SoC 2-100 such as the SoC 1-100 of FIG. 1. The system 200 further includes computer software, including an Operating System (OS) 2-202, an application 214, and a Power Manager (PM) 2-220. The computer software includes computer-executable instructions encoded within a non-transitory computer-readable medium. A CPU of the SoC 2-100 may be used to execute some or all of the computer software.

The OS 2-202 includes a device driver (driver) 204, a CPU frequency control (CPUfreq) subsystem 2-206, and an OS kernel 2-210. The OS 2-202 manages hardware resources, software services, and applications. In an embodiment, the OS 2-202 is an OS based on the Linux® OS, such as an Android™ OS, but embodiments are not limited thereto.

The OS 2-202 may also monitor the usage of the system, such as by monitoring whether a CPU is busy executing tasks or is idle. By monitoring whether the CPU is busy or idle, the OS 2-202 may determine a cumulative duty cycle (DC) of the CPU, such as a ratio of the time the CPU is busy to a duration of an interval. In an embodiment, the interval may include the time from when the system 200 was first turned on or first placed into service, that is, an age of the device. In another embodiment, the interval may include a total time the system 200 was turned on since the system 200 was initially turned on or placed into service, that is, a total operating time of the device.

The OS 2-202 may also compute a current utilization of the CPU, that is, a load on the CPU, according to the amount of time the CPU is busy or idle during a load computation interval substantially shorter than the interval used to calculate the cumulative DC. In an embodiment, the OS 2-202 may compute the current utilization of the CPU at the end of every task scheduling interval of the OS 2-202. In another embodiment, the OS 2-202 may compute the current utilization of the CPU at intervals of second or of a few seconds. The load on the CPU may be computed using CPU utilization information from the most recent CPU load computation interval, or may be computed using CPU utilization information from a predetermined number of the most recent CPU load computation intervals.

The driver 204 provides a means for software to interact with the hardware platform 201. The driver 204 may allow software to control a voltage and a clock frequency of a portion of the hardware platform 201, such as a CPU, memory, or peripheral device.

The OS kernel (kernel) 2-210 provides basic control over the hardware platform 201, including allocation of memory and control of which programs can access respective hardware resources. The kernel 2-210 includes a scheduler that determines which programs will execute and when they will execute.

The CPUfreq subsystem 2-206 provides control over a clock frequency of a CPU in the hardware platform 201, such as the CPU in the SoC 2-100. In an embodiment, the CPUfreq subsystem 2-206 also provides control over a voltage of the CPU. In an embodiment, the CPUfreq subsystem 2-206 may control clock frequencies and/or voltages of a plurality of CPUs in the hardware platform 201. In an embodiment, the CPUfreq subsystem 2-206 may control clock frequencies and/or voltages of a memory or a peripheral device in the hardware platform 201. The CPUfreq subsystem 2-206 may control a CPU clock frequency and a CPU voltage using a circuit such as the CVR circuit 108 shown in FIG. 1.

The CPUfreq subsystem 2-206 may provide a plurality of governors. A governor configures the CPUfreq subsystem 2-206 to implement a strategy for controlling a clock frequency and/or a voltage of a CPU. A governor may control a frequency and/or voltage based on one or more of a temperature, a battery charge level, a cumulative CPU duty cycle, an event that occurs, a mode of the system 200, and the like. A governor may include a minimum and a maximum frequency that the CPU may be run at. A governor may be an ondemand governor that controls a clock frequency according to a determination of how much computing power is currently being used.

The PM 2-220 monitors the system 200 and sends commands to the CPUfreq subsystem 2-206 and to the kernel 2-210. The PM 2-220 may be a user space power manager. The PM 2-220 may monitor one or more of a CPU temperature, cumulative CPU duty cycle, system events, and the like.

The PM 2-220 may be configured to determine a governor used by the CPUfreq subsystem 2-206 and/or to control parameters of a governor of the CPUfreq subsystem 2-206. The governor parameters set by the PM 2-220 may include one or more of a decision rate, a maximum frequency, a minimum frequency, an up threshold for raising a frequency, a down threshold for lowering a frequency, a step size for a frequency change, whether to consider low priority tasks when computing the load on the CPU, and the like.

FIGS. 3-7 illustrate processes for controlling a clock frequency. Although each of the processes illustrated in the figures is described with respect to a CPU, embodiments are not limited thereto. Embodiments of the processes described herein may control respective clock frequencies of one or more hardware subsystems such as a CPU, a graphics processor, a video decoder circuit, a display adapter circuit, a signal processor circuit, and the like.

Figure 3:
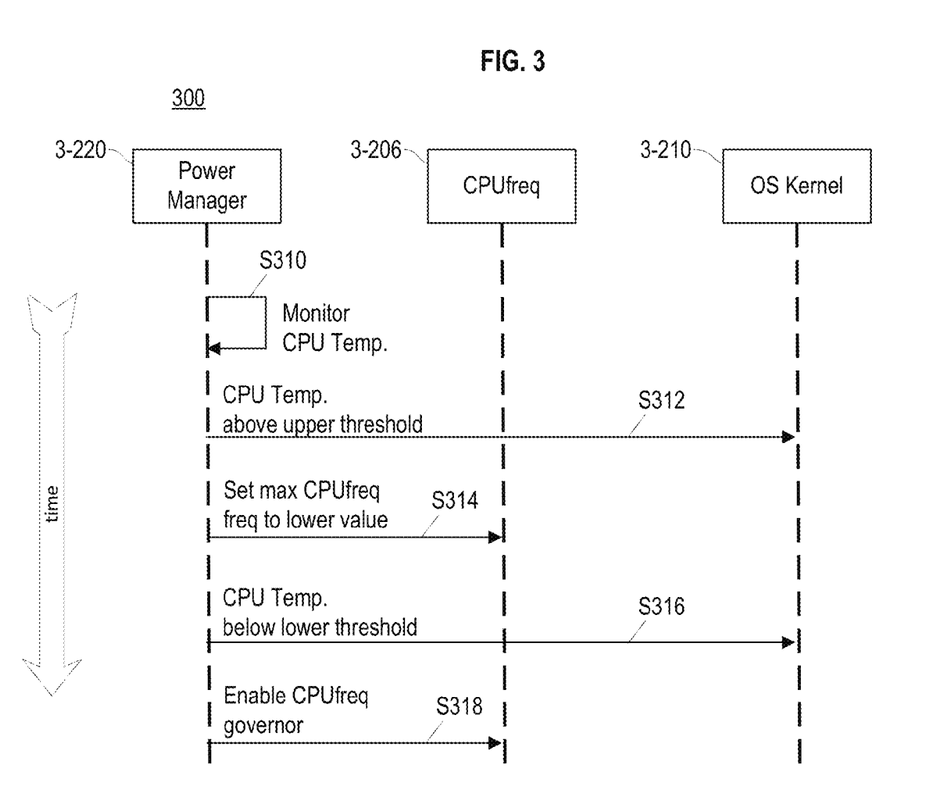
FIG. 3 illustrates a process of managing a clock frequency according to an embodiment.

FIG. 3 illustrates a process 300 of managing a clock frequency of a CPU (a CPU frequency) according to an embodiment, including operations of a PM 3-220, a CPUfreq subsystem 3-206, and a kernel 3-210 according to an embodiment.

At S310, the PM 3-220 monitors one or more of a CPU temperature and other temperatures within a system. The PM 3-220 periodically monitors the temperature throughout the process. The PM 3-220 may perform the monitoring once every several seconds, such as once every 1 to 7 seconds, according to how rapidly the monitored temperature may change.

At S312, the PM 3-220 determines that the monitored temperature has exceeded an upper temperature threshold and notifies the kernel 3-210 of the result of the determination. As a result of the determination at S312, at S314 the PM 3-220 controls the CPUfreq subsystem 3-206 to limit the CPU frequency so that it is less than or equal to a predetermined lower maximum frequency value substantially less than the maximum design frequency of the CPU. The maximum design frequency may be a maximum frequency at which a substantial majority of the CPUs manufactured are expected to operate reliably, or a maximum frequency specification of the CPU provided to users of the CPU.

In an embodiment, the PM 3-220 sets the maximum CPU frequency parameter of the CPUfreq subsystem 3-206 to a predetermined minimum frequency value when the monitored temperature exceeds the upper temperature threshold. In another embodiment, the PM 3-220 reduces the maximum CPU frequency parameter of the CPUfreq subsystem 3-206 by a step value each time the monitored temperature is determined to exceed the upper temperature threshold until the maximum CPU frequency parameter reaches a predetermined minimum frequency value.

At S316, the PM 3-220 determines that the monitored temperature is below a lower temperature threshold and notifies the kernel 3-210 of the result of the determination. As a result of the determination at S316, at S318 the PM 3-220 controls the CPUfreq subsystem 3-206 to enable operation at a higher CPU frequency.

In an embodiment, the PM 3-220 sets the maximum CPU frequency parameter of the CPUfreq subsystem 3-206 to a predetermined maximum frequency value when the monitored temperature is below the lower temperature threshold. In another embodiment, the PM 3-220 increases the maximum CPU frequency parameter of the CPUfreq subsystem 3-206 by a step value each time the monitored temperature is determined to be below the lower temperature threshold until the maximum CPU frequency parameter reaches a predetermined maximum frequency value.

In an embodiment, the PM 3-220 at S314 controls the CPUfreq subsystem 3-206 to use a first predetermined governor when the monitored temperature exceeds the upper temperature threshold, and at S318 controls the CPUfreq subsystem 3-206 to use a second predetermined governor when the monitored temperature is below the upper temperature threshold. The CPUfreq subsystem 3-206 continues to use the first or second predetermined governor until controlled to do otherwise.

Although the above description includes only the upper and lower temperature thresholds, embodiments are not limited thereto. In an embodiment, additional intermediate temperature thresholds may be provided, and each intermediate temperature threshold may be used by the PM 3-220 as described for either of the upper or lower temperature thresholds.

In an embodiment, a hardware fail-safe circuit also monitors the monitored temperature. When the fail-safe circuit determines that the monitored temperature exceeds a fail-safe temperature threshold, the fail-safe circuit may set the CPU frequency to a fail-safe minimum frequency value or may shut the CPU down. In an embodiment, once the fail-safe circuit has been triggered, the system must be powered down or rebooted to restore normal operation.

Figure 4:
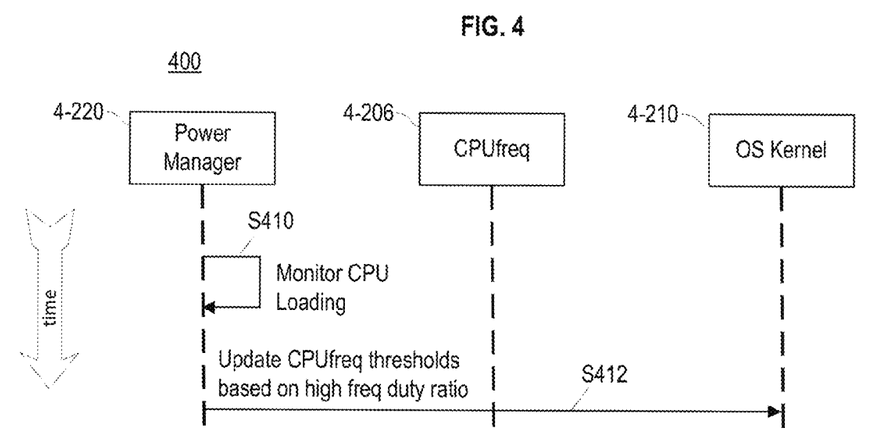
FIG. 4 illustrates a process of managing a clock frequency according to another embodiment.

FIG. 4 illustrates a process 400 of managing a CPU frequency according to another embodiment, including operations of a PM 4-220, a CPUfreq subsystem 4-206, and a kernel 4-210 according to an embodiment.

At S410, the PM 4-220 monitors a cumulative duty cycle (DC) during an interval. The PM 4-220 determines a load threshold and/or a maximum CPU frequency according to the cumulative DC during the interval. The PM 4-220 monitors the cumulative DC periodically.

In an embodiment, the cumulative DC is a ratio of a total time the CPU is operating at a maximum design frequency to the duration of the interval. In another embodiment, the cumulative DC is a ratio of a total time the CPU is operating at a frequency greater than or equal to a fraction of the maximum design frequency, such as, for example, the time the CPU is operating at 95% or more of the maximum design frequency, to the duration of the interval.

In an embodiment, the interval may include the time from when the system 200 was first turned on or first placed into service. In another embodiment, the interval may include all the time when the system 200 was turned on since the system 200 was first turned on or first placed into service.

At S412, the PM 4-220 determines a load threshold and/or a maximum CPU frequency according to the cumulative DC and communicates the load threshold and/or a maximum CPU frequency to the kernel 4-210, which provides the load threshold and/or a maximum CPU frequency to the CPUfreq subsystem 4-206.

The CPUfreq subsystem 4-206 uses the load threshold and/or a maximum CPU frequency to control a CPU frequency. The load threshold is used to determine when the CPU frequency is increased, such as by increasing the CPU frequency by a step or to the maximum CPU frequency when a load on the CPU exceeds the load threshold. The maximum CPU frequency determines the maximum frequency to which the CPUfreq subsystem 4-206 will set the CPU frequency.

Table 1 shows load thresholds and maximum frequencies according to cumulative DC according to an embodiment wherein a CPU has a maximum design frequency of 1.2 GHz and the PM is configured to maintain a cumulative DC of less than 11% over an interval.

TABLE 1

| Cumulative DC (cDC) | Load Threshold | Max. CPU frequency |
|---|---|---|
| cDC < 8% | 90% | 1.2 GHz |
| 8% ≤ cDC < 9% | 95% | 1.2 GHz |
| 9% ≤ cDC < 10% | 98% | 1.2 GHz |
| 10% ≤ cDC < 11% | 100% | 1.2 GHz |
| cDC ≥ 11% | 100% | 1.0 GHz |

Referring to Table 1, when the cumulative DC over the interval is less than 8%, the PM 4-220 controls the load threshold so that the CPU frequency is increased when the current load on the CPU is over 90%, up to a maximum frequency of 1.2 GHz, that is, up to the maximum design frequency. When the cumulative DC over the interval is greater than or equal to 8% and less than 9%, the PM 4-220 controls the load threshold so that the CPU frequency is increased when the current load on the CPU is over 95%, up to a maximum frequency of 1.2 GHz. When the cumulative DC over the interval is greater than or equal to 9% and less than 10%, the PM 4-220 controls the load threshold so that the CPU frequency is increased when the current load on the CPU is over 98%, up to a maximum frequency of 1.2 GHz.

When the cumulative DC over the interval is greater than or equal to 10% and less than 11%, the PM 4-220 controls the load threshold so that the CPU frequency is increased when the current load on the CPU is at 100%, that is, when the CPU is fully utilized, up to a maximum frequency of 1.2 GHz. When the cumulative DC over the interval is greater than or equal to 11%, the PM 4-220 controls the load threshold so that the CPU frequency is increased when the current load on the CPU is at 100%, up to a maximum frequency of 1.0 GHz. Because the PM 4-220 prevents the CPU from running at the maximum design frequency when the cumulative DC exceeds 11%, the cumulative DC will then decline until the cumulative DC is below 11%.

Figure 5:
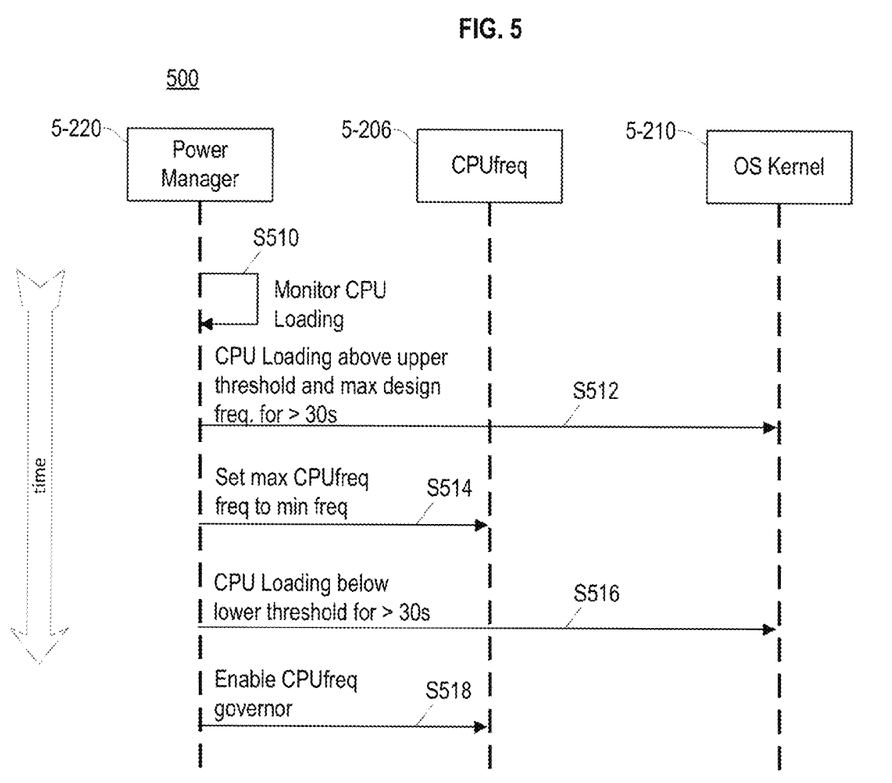
FIG. 5 illustrates a process of managing a clock frequency according to another embodiment.

FIG. 5 illustrates a process 500 of managing a CPU frequency according to another embodiment, including operations of a PM 5-220, a CPUfreq subsystem 5-206, and a kernel 5-210 according to an embodiment.

At S510, the PM 5-220 monitors a cumulative DC during an interval. In an embodiment, the cumulative DC is a ratio of a time the CPU is operating at a maximum design frequency to the duration of the interval. The PM 5-220 monitors the cumulative DC periodically while the process 500 is active.

In an embodiment, the interval may include the time from when the system 200 was first turned on or first placed into service. In another embodiment, the interval may include all the time when the system 200 was turned on since the system 200 was first turned on or first placed into service.

As S512, the PM 5-220 determines that the cumulative DC has exceeded an upper duty cycle threshold (DCT) and that the CPU has been operating at the maximum design frequency for a period of time, such as 30 seconds. The PM 5-220 notifies the kernel 5-210 of the result of the determination. As a result of the determination at S512, at S514 the PM 5-220 controls the CPUfreq subsystem 5-206 to limit the CPU frequency so that it is less than or equal to a predetermined lower maximum frequency value substantially less than a maximum design frequency of the CPU.

At S516, the PM 5-220 determines that the cumulative DC has been below a lower DCT for a period of time, such as 30 seconds, and notifies the kernel 5-210 of the result of the determination. As a result of the determination at S516, at S518 the PM 5-220 controls the CPUfreq subsystem 5-206 to enable operation at a higher CPU frequency, such as by enabling a governor of the CPUfreq subsystem 5-206 and controlling a parameter of the CPUfreq subsystem 5-220 to limit the CPU frequency to the maximum design frequency.

The PM 5-220 is configured to allow a short burst of maximum performance even when the cumulative DC is above the upper DCT, and does not allow another such burst until the cumulative DC has dropped below a lower DCT for a period of time. In an embodiment, the upper DCT is substantially equal to the lower DCT.

Although the above description includes only the upper and lower DCTs, embodiments are not limited thereto. In an embodiment, additional intermediate DCTs may be provided, and each intermediate DCT may correspond to an allowed burst of higher performance having a different CPU frequency and/or duration.

Figure 6:
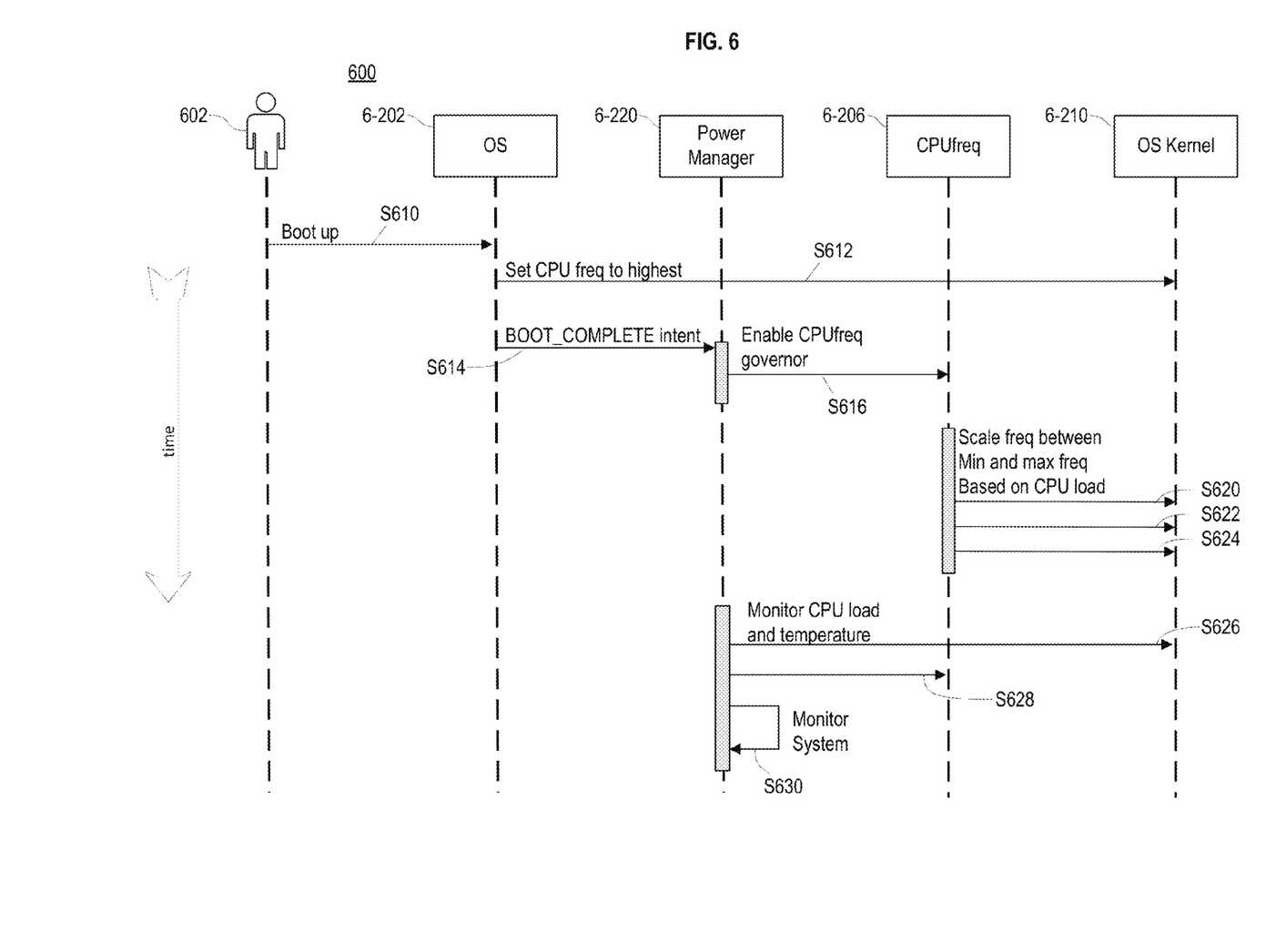
FIG. 6 illustrates a process of managing a clock frequency according to another embodiment.

FIG. 6 illustrates a process 600 of managing a CPU frequency according to another embodiment, including operations of an OS 6-202 and a Power Manager (PM) 6-220, a CPUfreq subsystem 6-206, and a kernel 6-210 of the OS 6-202 according to an embodiment. In an embodiment, the OS 6-202 includes one or more of a Built-In Operating System (BIOS), a bootloader, a system initialization (sys_Init) function, and the like.

At S610, the OS 6-202 receives a command from a user 602, such as a command to start the system ("boot up") or to launch an application, such as the application 214 shown in FIG. 2. Completion of the command may include the execution of a relatively large number of CPU instructions, and minimizing the time to complete the command may be desirable.

At S612, the OS 6-202 operates to set a CPU frequency to a maximum design frequency in response to receiving the command and before initiating the boot up or application launch, so that the CPU frequency is set to a highest value at an early stage of the boot process. The CPU frequency may be set by the BIOS, the bootloader, or the sys_Init function of the OS 6-202. When the command is a boot up command, the OS 6-202 may set the CPU frequency using the OS kernel 6-210. When the command is to launch an application, the OS 6-202 may set the CPU frequency using the CPUfreq subsystem 6-206.

In an embodiment, when the boot process or application launch is complete, at S614 the OS 6-202 indicates the completion to the PM 6-220. In response, at S616 the PM 6-220 enables a governor of the CPUfreq subsystem 6-206, which initiates or restores the dynamic handling of the CPU frequency based on the CPU load.

In another embodiment, a timer causes the PM 6-220 to enable a governor, such as an ondemand governor or an interactive governor, of the CPUfreq subsystem 6-206 a predetermined time after the occurrence of S612.

In response to the governor of the CPUfreq subsystem 6-206 being enabled, at S620, S622, and S624 the CPUfreq subsystem 6-206 controls the CPU frequency according to the policies and thresholds of the governor. The governor is configured to determine the CPU frequency according to the CPU load.

At S626, the PM 6-220 determines the CPU load and a temperature of the system and notifies the kernel 6-210 of the results of the determination. When the results of the determination at S626 indicate accordingly, such as described in relation to FIGS. 3-5, at S628 the PM 6-220 alters one or more of the governor and a parameter of the CPUfreq subsystem 6-206. At S630, the PM 6-220 periodically monitors the CPU load and the temperature.

Figure 7:
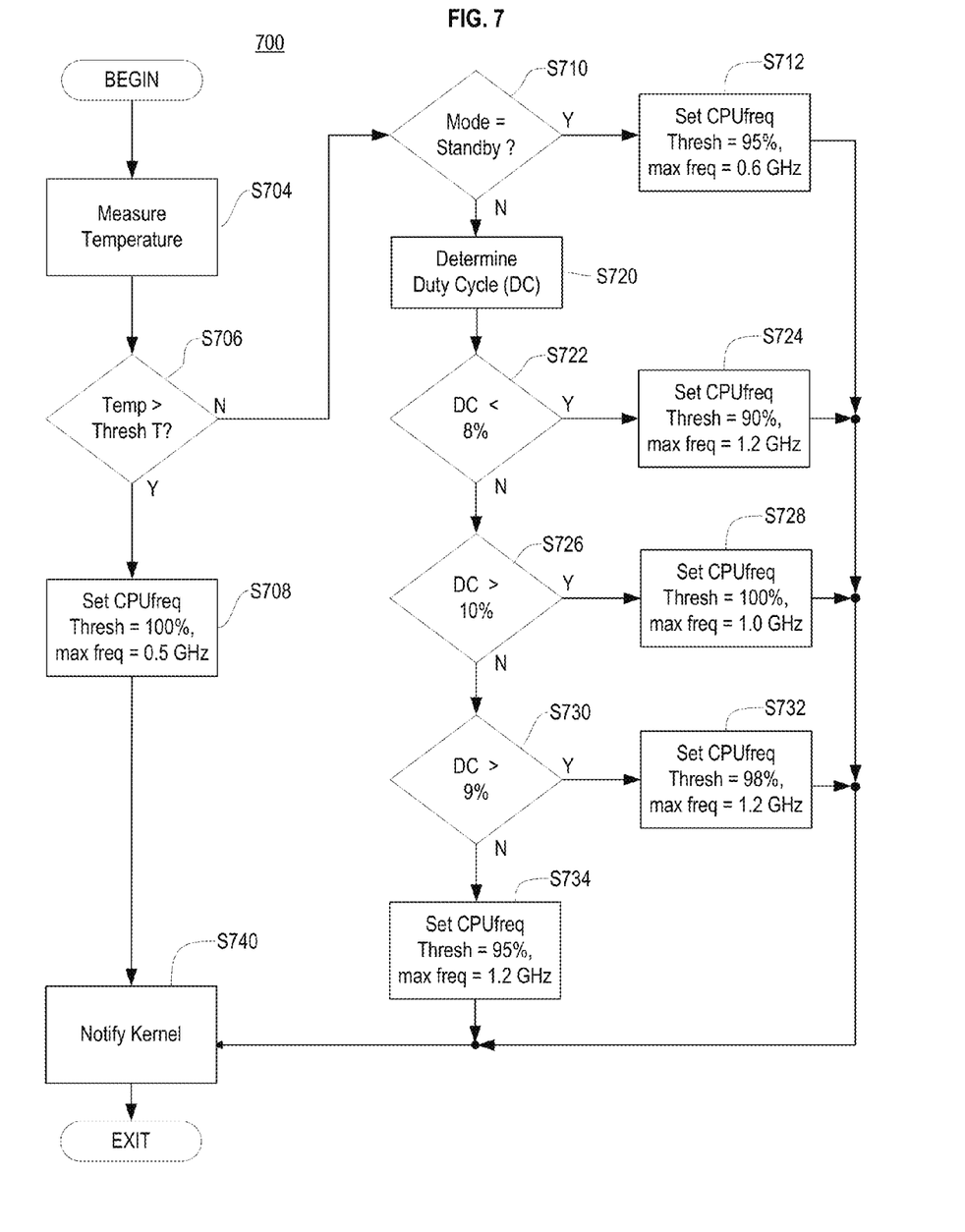
FIG. 7 is a flowchart of a process of managing a clock frequency according to an embodiment.

FIG. 7 is a flowchart of a process 700 of managing a CPU frequency according to an embodiment. The process 700 is suitable for periodic execution, such as once every few seconds, by a power manager (PM) such as the PM 2-220 of the system 200 of FIG. 2. FIG. 7 illustrates the operation of the process 700 in a system including a CPU with a maximum design frequency of 1.2 GHz and a target cumulative duty cycle of 10%. Periodic execution of the process 700 extends a product lifetime by limiting a cumulative duty cycle of the CPU during an interval.

Although the flowchart in FIG. 7 illustrates particular sequences of operations, a person of ordinary skill in the art in light of the teachings and disclosures herein would understand that embodiment are not limited thereto.

At S704, a temperature, such as a CPU temperature, is measured. At S706, the measured temperature is compared to a temperature threshold T. In an embodiment, a hardware temperature monitor circuit is configured to measure the temperature and perform the comparison. In another embodiment, the temperature is measured and compared to the temperature threshold T using software executed by the CPU.

When the measured temperature exceeds the temperature threshold T, at S708 a threshold of a CPU frequency control (CPUfreq) subsystem is set to 100%, which configures the CPUfreq subsystem to only increase a CPU frequency if the CPU is fully loaded. In addition, a maximum allowable frequency parameter of the CPUfreq subsystem is set to a frequency value substantially lower than a maximum design frequency of the CPU, such as 500 MHz.

When the measured temperature is less than the temperature threshold T, at S710 a mode of the system is determined. When the mode of the system is a standby mode, at S712 a threshold of the CPUfreq subsystem is set to 95%, which configures the CPUfreq subsystem to only increase a CPU frequency if the CPU is 95% or more loaded. In addition, a maximum allowable frequency parameter of the CPUfreq subsystem is set to a value substantially lower than a maximum design frequency of the CPU, such as 600 MHz.

When the mode of the system is not the standby mode, at S720 a cumulative duty cycle DC is determined. The duty cycle DC is computed over an interval, such as a time since the system was first turned on or a cumulative on time of the system. In an embodiment, the duty cycle DC is computed by dividing the cumulative amount of time the CPU operated at the maximum design frequency by the duration of the interval. In another embodiment, the duty cycle DC is computed by dividing a time the CPU is operating at a frequency greater than or equal to a fraction of the maximum design frequency, such as the time the CPU is operating at 95% or more of the maximum design frequency, by the duration of the interval.

In an embodiment, the loading of the CPU or other circuit being controlled may be determined at a very low frequency, and may be performed by a power manager application. In another embodiment, a kernel module is created for each subsystem or class of subsystem so that the loading can be measured more frequently.

In an embodiment, the duty cycle DC may be estimated based on a use case rather than being measured. In an embodiment, each function which can be carried out using the CPU has an associated estimated duty cycle. For example, during a first time period when the CPU is being primarily used to decode a standard definition (SD) video stream, the CPU may be estimated as having run at the maximum design frequency for a first fraction of the first time period, and during a second time period when the CPU is being primarily used to decode a high definition (HD) video stream, the CPU may be estimated as having run at the maximum design frequency for a second fraction of the first time period, wherein the second fraction is substantially larger than the first fraction. In an embodiment, a subsystem that lacks a convenient means of measuring its load is managed using estimates of the loading of the subsystem, wherein the estimates are based on use cases.

At S722, the duty cycle DC is compared to a lower DCT value, such as 8%. When the duty cycle DC is less than the lower DCT value, at S724 the CPUfreq subsystem is configured to increase a CPU frequency if the CPU is 90% or more loaded, and a maximum allowable frequency parameter of the CPUfreq subsystem is set to the maximum design frequency of the CPU, such as 1.2 GHz.

At S726, the duty cycle DC is compared to an upper DCT value, such as 10%. When the duty cycle DC is greater than the upper DCT value, at S728 the CPUfreq subsystem is configured to increase the CPU frequency only if the CPU is fully loaded, and a maximum allowable frequency parameter of the CPUfreq subsystem is set to a value substantially below the maximum design frequency of the CPU, such as 1.0 GHz.

At S730, the duty cycle DC is compared to an intermediate DCT value, such as 9%. When the duty cycle DC is greater than the intermediate DCT value, that is, between 9% and 10%, at S732 the CPUfreq subsystem is configured to increase the CPU frequency if the CPU is 98% or more loaded, and a maximum allowable frequency parameter of the CPUfreq subsystem is set to the maximum design frequency of the CPU. When the duty cycle DC is less than or equal to the intermediate DCT value, that is, between 8% and 9%, at S734 the CPUfreq subsystem is configured to increase the CPU frequency if the CPU is 95% or more loaded, and a maximum allowable frequency parameter of the CPUfreq subsystem is set to the maximum design frequency of the CPU.

At S740, an operating system (OS) kernel is notified of the determinations made and the actions taken by the process 700.

In an embodiment, at one or more of S708, S712, S724, S728, S732, and S734, a power supply voltage of a power domain including the CPU is adjusted to a lowest available voltage at which the CPU and other subsystems in the power domain will function reliably when operating at the frequency value that the maximum allowable frequency parameter is set to and at a the measured temperature determined at S704. In an embodiment where a plurality of subsystems in the power domain are subject to frequency control, the power supply voltage of a power domain is adjusted to a lowest available voltage at which all the subsystems in the power domain will operate reliably for their respective maximum allowable frequency values.

For example, in an embodiment, first and second subsystems may be in a same power domain and each having their clocks and voltages controlled. The power manager may determine that the first subsystem should have a first clock frequency and a first operating voltage, and that the second subsystem should have a second clock frequency and a second operating voltage. The power manager sets the power supply voltage of the power domain to the higher of the first and second operating voltages to ensure that the first and second subsystem both operate reliably.

In another embodiment, the process 700 is used to control one or more frequencies of circuits other than a CPU, such as one or more of a peripheral circuit, a memory controller, a display adapter, a Graphics Processing Unit (GPU) within the display adapter, and the like. The frequencies of the circuits other than a CPU may be controlled using respective device drivers such as the device driver 204 shown in FIG. 2. In an embodiment, the process 700 is periodically executed by a power manager included in the device driver.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:
1. A computer-implemented method for controlling a clock frequency, the computer-implemented method comprising:
   determining a cumulative duty cycle (DC) according to a ratio of a cumulative time, during an interval, that the clock frequency has a frequency greater than or equal to a design frequency threshold value to a duration of the interval;

controlling a frequency of the clock frequency to be a first frequency value when the cumulative DC is less than a first duty cycle threshold (DCT); and controlling the frequency of the clock frequency to be a second frequency value less than the first frequency value when the cumulative DC is greater than a second DCT, wherein the second DCT is greater than or equal to the first DCT, and wherein the design frequency threshold value is a maximum design frequency of a circuit operated using a signal having the clock frequency or a predetermined fraction of the maximum design frequency.

2. The computer-implemented method of claim 1, further comprising configuring a frequency control subsystem to control the clock frequency according to a current utilization of a circuit using the clock frequency when the cumulative DC is less than the first DCT, wherein the frequency of the clock frequency is a maximum frequency of the clock frequency, and the first and second frequency values are first and second maximum frequency values, respectively.

3. The computer-implemented method of claim 2, further comprising controlling a load threshold of the frequency control subsystem to have a first load threshold value when the cumulative DC is less than the first DCT, wherein the frequency control subsystem is configured to increase the clock frequency when the current utilization of the circuit is greater than the load threshold and the clock frequency is less than the first maximum frequency value.

4. The computer-implemented method of claim 3, further comprising controlling the load threshold of the frequency control subsystem to have a second load threshold value when the cumulative DC is greater than a third DCT and less than the second DCT, wherein the third DCT is less than the second DCT.

5. The computer-implemented method of claim 3, further comprising when a system including a clock circuit has a mode equal to a predetermined mode value:

controlling the frequency of the clock frequency to be a third frequency value; and controlling the load threshold of the frequency control subsystem to have a second load threshold value.

6. The computer-implemented method of claim 1, further comprising controlling the clock frequency to be a third frequency value in response to receiving a command to boot a system or to launch an application, regardless of the value of the cumulative DC.

7. The computer-implemented method of claim 1, wherein the interval includes a total operating time of the clock circuit or a total time between a time a clock circuit is first turned on and a present time.

8. The computer-implemented method of claim 1, wherein a clock circuit provides a signal at the clock frequency to a Central Processing Unit (CPU).

9. The computer-implemented method of claim 1, wherein determining the cumulative DC includes estimating the ratio according to a use case.

10. A system for controlling a clock frequency of a clock circuit, the system comprising:

a hardware platform including a processor;
a clock circuit having a clock frequency; and
a power management subsystem (PM), wherein the PM is configured to:

determine a cumulative duty cycle (DC) according to a ratio of a cumulative time, during an interval, that the clock frequency has a frequency greater than a design frequency threshold value during an interval to a duration of the interval;

control a frequency of the clock frequency to be a first frequency value when the cumulative DC is less than a first duty cycle threshold (DCT); and control the frequency of the clock frequency to be a second frequency value less than the first frequency value when the cumulative DC is greater than a second DCT, wherein the second DCT is greater than or equal to the first DCT, and wherein the interval includes a total operating time of the clock circuit or a total time between a time the clock circuit is first turned on and a present time.

11. The system of claim 10, further comprising a frequency control subsystem, wherein the frequency control subsystem is configured to control the clock frequency according to a current utilization of a hardware subsystem using the clock frequency when the cumulative DC is less than the first DCT, and wherein the frequency is a maximum frequency of the clock frequency, and the first and second frequency values are first and second maximum frequency values, respectively.

12. The system of claim 11, wherein the PM is configured to control a load threshold of the frequency control subsystem to have a first load threshold value when the cumulative DC is less than the first DCT, and wherein the frequency control subsystem is configured to increase the clock frequency when the current utilization of the hardware subsystem is greater than the load threshold and the clock frequency is less than the first frequency value.

13. The system of claim 12, wherein:

the PM is configured to control the load threshold of the frequency control subsystem to have a second load threshold value when the cumulative DC is greater than a third DCT and less than the second DCT; and the third DCT is less than the second DCT.

14. The system of claim 12, wherein the PM is configured to control the frequency of the clock frequency to be a third frequency value and control the load threshold of the frequency control subsystem to have a second load threshold value when a system including the clock circuit has a mode equal to a predetermined mode value.

15. The system of claim 10, wherein the PM is configured to control the clock frequency to be a third frequency value in response to the system receiving a command to boot a system or to launch an application, regardless of the value of the cumulative DC.

16. The system of claim 10, wherein determining the cumulative DC includes estimating the ratio according to a use case.

17. A non-transitory computer-readable medium encoded with computer-executable instructions for controlling a clock frequency, which, when executed, perform a method comprising:

determining a cumulative duty cycle (DC) according to a ratio of a cumulative time the clock frequency has a frequency greater than a design frequency threshold value during an interval by a duration of the interval;

controlling a frequency of the clock frequency to be a first frequency value when the cumulative DC is less than a first duty cycle threshold (DCT);

controlling the frequency of the clock frequency to be a second frequency value less than the first frequency value when the cumulative DC is greater than a second DCT: and controlling the load threshold of the frequency control subsystem to have a second load threshold value when the cumulative DC is greater than a third DCT and less than the second DCT, wherein the second DCT is greater than or equal to the first DCT, and wherein the third DCT is less than the second DCT.

18. The non-transitory computer-readable medium of claim 17, wherein controlling the frequency of the clock frequency to be the first frequency value includes configuring a frequency control subsystem to control the clock frequency according to a current utilization of a circuit using the clock frequency, and wherein the frequency is a maximum frequency of the clock frequency, and the first and second frequency values are first and second maximum frequency values, respectively.

19. The non-transitory computer-readable medium of claim 18, wherein controlling a frequency of the clock frequency to be the first frequency value includes controlling a load threshold of the frequency control subsystem to have a first load threshold value, and wherein the frequency control subsystem is configured to increase the clock frequency when the current utilization of the circuit is greater than the load threshold and the clock frequency is less than the first maximum frequency value.

* * * * *